Figure 1:
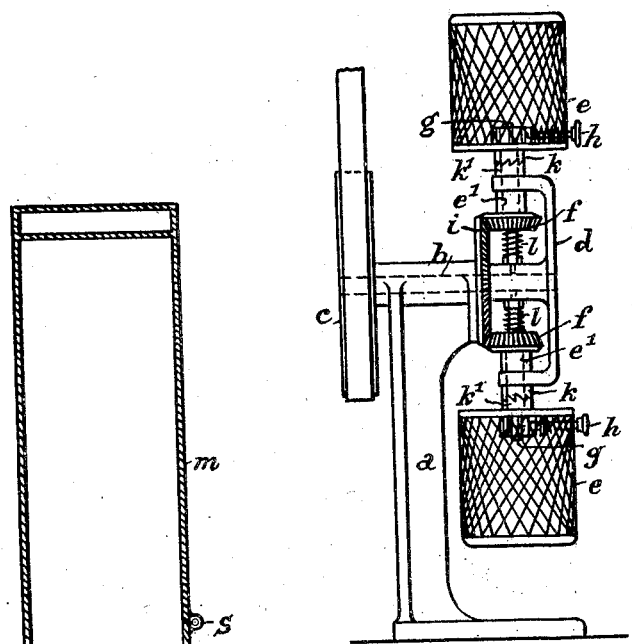

March 9, 1926. 1,576,149
R. SIEGERT
PROCESS AND APPARATUS FOR THE MANUFACTURE OF HOLLOW OBJECTS OF CHOCOLATE
Filed Dec. 24, 1924 2 Sheets-Sheet 1

Inventor:-
Richard Siegert
by attorneys

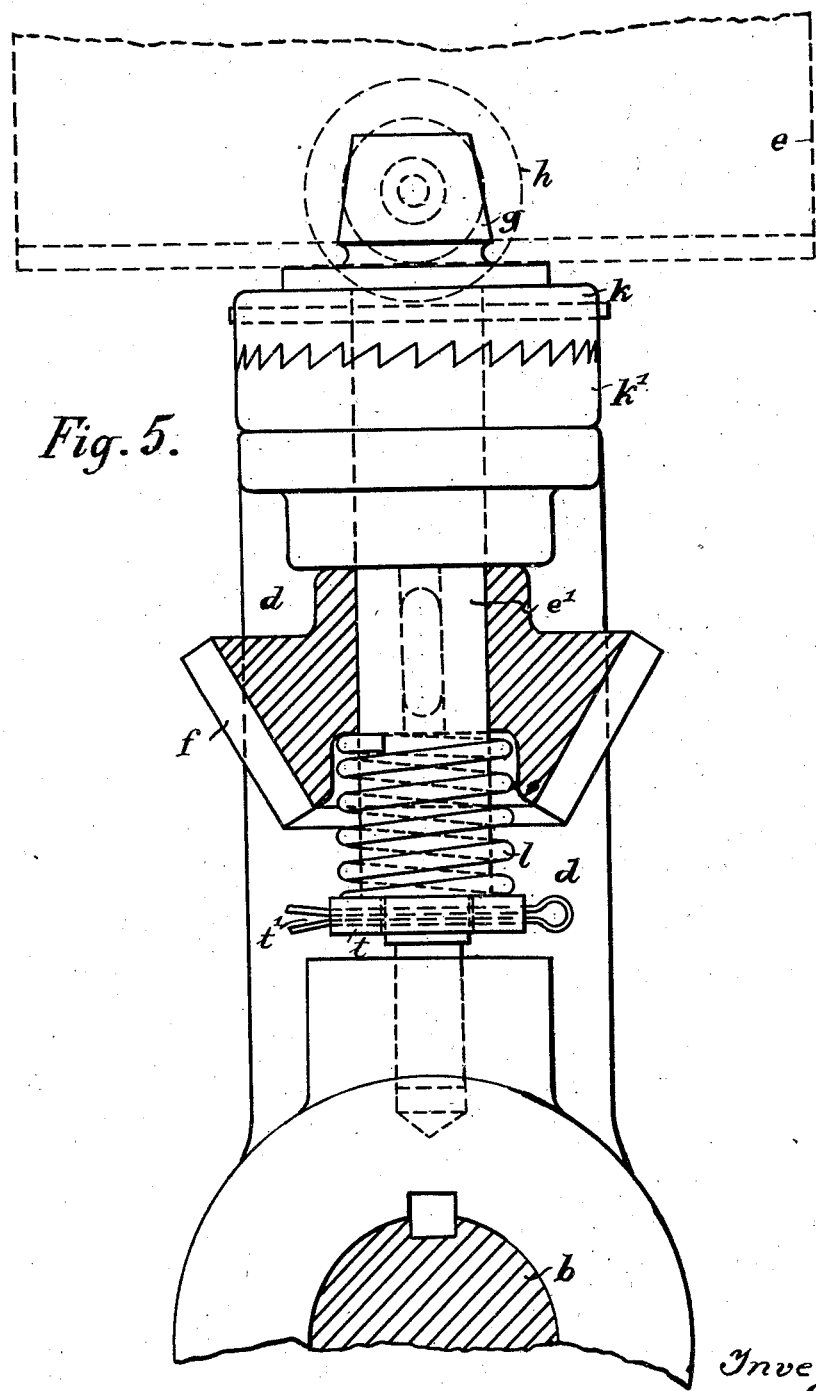

Patented Mar. 9, 1926.

1,576,149

UNITED STATES PATENT OFFICE.

RICHARD SIEGERT, OF DRESDEN, GERMANY.

PROCESS AND APPARATUS FOR THE MANUFACTURE OF HOLLOW OBJECTS OF CHOCOLATE.

Application filed December 24, 1924. Serial No. 757,957.

*To all whom it may concern:*

Be it known that I, RICHARD SIEGERT, a subject of the Free State of Saxony, German Republic, and a resident of Dresden, Free State of Saxony, German Republic, have invented a new and useful Process and Apparatus for the Manufacture of Hollow Objects of Chocolate, of which the following is a specification.

The present invention has for its object a process and an apparatus for the manufacture of hollow objects of chocolate, as for instance small animals, balls, eggs and figures of any kind.

First of all, the process forming the object of the present invention consists in that double-moulds partly filled with liquid chocolate-mass are inserted into receptacles and a planetary motion is imparted to said receptacles so that the latter are subject to a rotary movement in a vertical plane and simultaneously to a rotary movement round their longitudinal axis. Said process is, secondly, still extended in that the receptacles containing the double-moulds filled with liquid chocolate are, during their planetary motion, subject to a springing or jumping movement in the direction of the longitudinal axis of said receptacles.

The employment of the planetary-movement of the receptacles filled with double-moulds containing liquid chocolate tends to prevent any thickened and settled parts within the chocolate-mass to be transformed into figures, and allows regulation of the speed used for the apparatus arranged to perform the process forming the object of the present invention within wider limits than with the apparatus of similar kind known up to the present, in which the transition from a slow rotation usually required to a very high one is always accompanied by difficulties.

A favorable and very uniform distribution of the chocolate-mass inserted into the double-moulds is also obtained and ensured by a springing or jumping movement imparted to the receptacles containing the partly filled double-moulds during their planetary-motion, said springing or jumping movement causing a special shaking of the chocolate-mass prior to and during the contact with the walls of the separate double-moulds, said contact being the result of the centrifugal-power actuated against the receptacles. By said shaking movement of the mass the latter is uniformly distributed within the double-moulds and becomes of highly uniform density and structure or grain.

As stated above, the process in question can still further be improved by exposing the chocolate-mass contained within the double-moulds and subjected to the combined planetary and springing or jumping movement to a cold air draught for the purpose of cooling said moulds as quickly as possible.

The apparatus for performing the process of manufacture of hollow chocolate-bodies forming the object of the present invention consists in the arrangement of a series of receptacles or containers (two at least) for receiving the double-moulds partly filled with liquid chocolate-mass, each of said receptacles or containers being connected under spring-pressure to a shaft suitably rotated. All receptacles are mounted on the periphery of a disc fastened to said shaft horizontally arranged and suitably rotated for instance by a pulley. In this manner, all receptacles are rotated together in a vertical plane.

Now, for the purpose of imparting, during said vertical rotary movement of the receptacles, a rotary movement to the latter round their longitudinal axis, a planet-wheel series is arranged, consisting of a bevel-gear stationarily arranged round the shaft mentioned and a number of bevel-gears (two at least) engaging said stationary bevel-gear and fastened each on the vertical axis of each receptacle.

For causing a springing or jumping movement of the receptacles during their planetary motion a clutch consisting of two parts engaging one into another is arranged between each receptacle and the disc carrying it. One part of the clutch is fastened to the periphery of the flanged disc, and the other part rotates during the rotary movement of the axis of the receptacle and slides by its teeth over the teeth of the stationary clutch-part. During said sliding movement the movable clutch-part is raised and causes a springing or jumping movement of each separate receptacle.

An example of construction of an apparatus for performing the process for the manufacture of hollow bodies of chocolate-mass according to the present invention is shown in the drawing, annexed to the specification.

Figures 2, 3, 4:
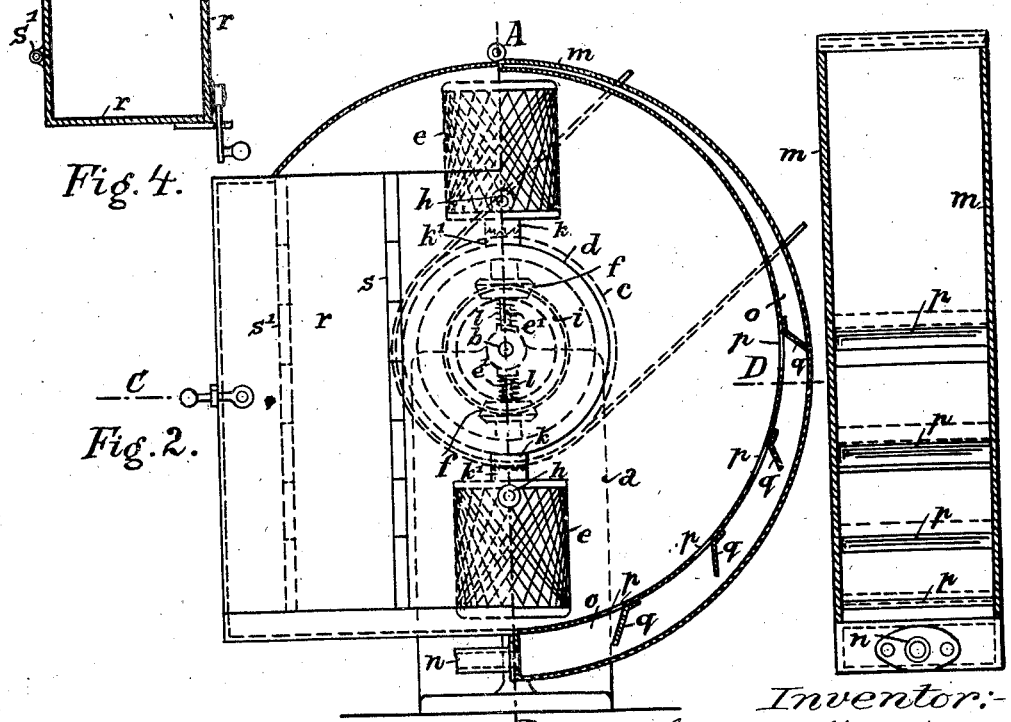

Fig. 1 is a side-elevation of the apparatus and Fig. 2 a longitudinal elevation of it arranged in combination with a jacket or casing through which a draught of cooling-air or other cooling-medium is supplied for the purpose of cooling the moulds as quickly as possible during or after the moulding of the chocolate-mass contained therein. Fig. 3 is a transverse section of the casing through line AB of Fig. 2 and Fig. 4 a horizontal section of the casing through line CD in Fig. 2. Figure 5 shows in front elevation partly in section a detail of the construction of the device for imparting a springing action to the receptacles $e$.

$a$ is the frame of the apparatus and $b$ the shaft horizontally mounted in the upper part of the frame mentioned. $c$ is a pulley fastened to one extremity of the shaft $b$, on the other extremity of which a flanged disc $d$ is mounted. The flange and the hub of the disc $d$ form bearings for the shafts $e^1$ of a number of receptacles $e$ arranged with a perforated wall formed, for instance, of wire-gauze, said receptacles containing a number of double-moulds partly filled with liquid chocolate-mass. According to Figs. 1 and 2 only two receptacles $e$ diametrically arranged one to another are shown. In case of more than two such receptacles they are arranged in a star-like manner on and round the flanged disc $d$.

Said disc $d$ carrying the receptacles $e$ is rotated in a vertical plane by the rotary movement of the shaft $b$. Now, to rotate, during the rotary movement of said receptacles, the latter round their own axes (planetary motion), each of the bevel-gears $f$ is mounted on the respective shaft $e^1$ of the receptacles $e$, said bevel-gears engaging a bevel-gear $i$ stationarily arranged round the shaft $b$ and fastened to the frame of the apparatus. The shafts $e^1$ are so arranged as slide in a longitudinal direction through the bevel-gears $f$.

The operation of the parts mentioned above is as follows:

During the rotary movement of the shaft $b$, the flanged disc $d$ mounted on it and the receptacles $e$ arranged with their shafts $e^1$ on the periphery of said disc are rotated in a vertical plane also. The receptacles mentioned are fastened to the shafts $e^1$ by trunnions $g$ in such a manner that they may partake of the rotary movement of the shafts mentioned.

A yielding bolt $h$ suitably fastened to each of the receptacles prevents an unintentional disengagement of the latter from their shafts $e^1$.

The parts shown in detail in Figure 5 serve to combine with the planetary rotary movement of the receptacles $e$ an additional springing or jumping movement. As clearly seen from said figure representing the parts of the device temporarily situated above the horizontally mounted shaft $b$, the bevel-gear $f$ is loosely arranged on the shaft $e^1$ and adjustably connected with the latter by groove and tongue. The bevel-gear $f$ engaging the stationary bevel-gear $i$ is provided in its lower part with a central circular groove, whereas a disc $t$ is fastened by a splint $t^1$ to the shaft $e^1$ near its lower end. A spring $l$ is inserted between the disc $t$ and the bevel-gear $f$ in such a manner that during the rotary movement of the flanged disc $d$ the bevel-gear $f$ is rotated by its engagement with the stationary bevel-gear $i$ (Fig. 1). Together with said rotary movement the shaft $e^1$ is rotated, taking with it the upper clutch-part $k$. During said rotation the teeth of the clutch-part $k$ slide along the teeth of the stationary clutch-part $k^1$ and are simultaneously raised so as to raise the shaft $e^1$, thereby compressing the spring $l$. If the lower points of the teeth of the upper clutch-part $k$ have reached and surpassed the upper points of the teeth of the lower stationary clutch-part $k^1$, the spring $l$ acts against the disc $t$ and moves the latter in a downward direction in such a manner that the teeth of the upper clutch-part fall again into the interstices between each two teeth of the lower clutch-part $k^1$.

The procedure described is repeated in a fast succession and thus the springing or jumping movement of the receptacles is obtained and ensured.

Now if it is intended to cool the chocolate-mass contained within the double-moulds as quickly as possible during and after the moulding-procedure of the mass, the apparatus described is surrounded by a sheet iron jacket or casing for supplying a cold air draught towards the receptacles rotating within said jacket shown in Figs. 2, 3 and 4.

$m$ is the sheet iron jacket or casing and $n$ a pipe arranged near the bottom of it and supplying a draught of compressed cold-air into the passage or conduit $o$ decreasing in section towards its upper part. The wall of the jacket $m$ situated on the side of the rotating receptacles is in an open connection with the interior of the jacket by slots $p$ to which the cold air draught is directed by the guiding plates $q$ into the interior of the jacket $m$.

The left-hand part of the jacket or casing $m$ is provided with doors $r$ which can be moved round the hinges $s$, $s^1$, whereas the right-hand part of said jacket is in the shape of a closed hollow chamber, in which the receptacles together with the partly filled double-moulds are rotated and the compressed cooling air is made use of for a very rapid cooling down of the contents of the moulds.

The passage or conduit *o* may be replaced by cooling pipes transmitting their cold to the moulds of the receptacles rotating within the jacket or casing, without departing from the spirit and scope of this invention.

What I claim is:

1. A process for the manufacture of hollow bodies of choclate-mass which consists in partly filling double-moulds with liquid chocolate-mass, inserting said filled moulds in receptacles, imparting a planetary motion to said receptacles and imparting to the latter simultaneously with said motion a springing or jumping movement.

2. A process for the manufacture of hollow bodies of choclate-mass which consists in partly filling double-moulds with liquid chocolate-mass, inserting said filled moulds in receptacles, imparting a planetary motion to said receptacles, imparting to the latter simultaneously with said motion a springing or jumping movement and cooling down the contents of the double-moulds during their planetary motion by a cooling medium.

3. In an apparatus for the manufacture of hollow bodies of chocolate-mass, in combination with double-moulds partly filled chocolate-mass, of means for receiving said filled double-moulds, means for imparting a planetary motion to the moulds mentioned and means for imparting a springing or jumping movement to said moulds during the planetary motion mentioned.

4. In an apparatus for the manufacture of hollow bodies of chocolate-mass, in combination with double-moulds partly filled with chocolate-mass, of receptacles for receiving said double-moulds, a disc supporting bevel-gears engaging a stationary bevel-gear, a shaft driving said disc together with the bevel-gears and the receptacles, and clutches for imparting a springing or jumping movement of the receptacles under spring action and containing the partly filled double-moulds, the toothed parts of said clutches alternately engaging and disengaging one into another under spring-action for imparting a permanent springing or raising and lowering movement of the receptacles, 5. In an apparatus for the manufacture of hollow bodies of chocolate-mass, in combination with double-moulds partly filled with chocolate-mass, of receptacles for receiving said double-moulds, a disc supporting bevel-gears engaging a stationary bevel-gear, a shaft driving said disc together with the bevel-gears and the receptacles, and clutches for imparting a springing or jumping movement of the receptacles under spring-action and containing the partly filled double-moulds, the toothed parts of said clutches alternately engaging and disengaging one into another for imparting a permanent springing or raising and lowering movement of the receptacles under spring-action and a jacket, surrounding the apparatus and suppying a cold air draught towards the receptacles and the double-moulds contained in them for rapidly cooling the contents of said moulds.

In testimony, that I claim the foregoing as my invention, I have signed my name this 8th day of December 1924.

RICHARD SIEGERT.